Nov. 3, 1953  E. D. RAPISARDA  2,657,647
CONFECTION MACHINERY
Filed July 2, 1946  6 Sheets-Sheet 1
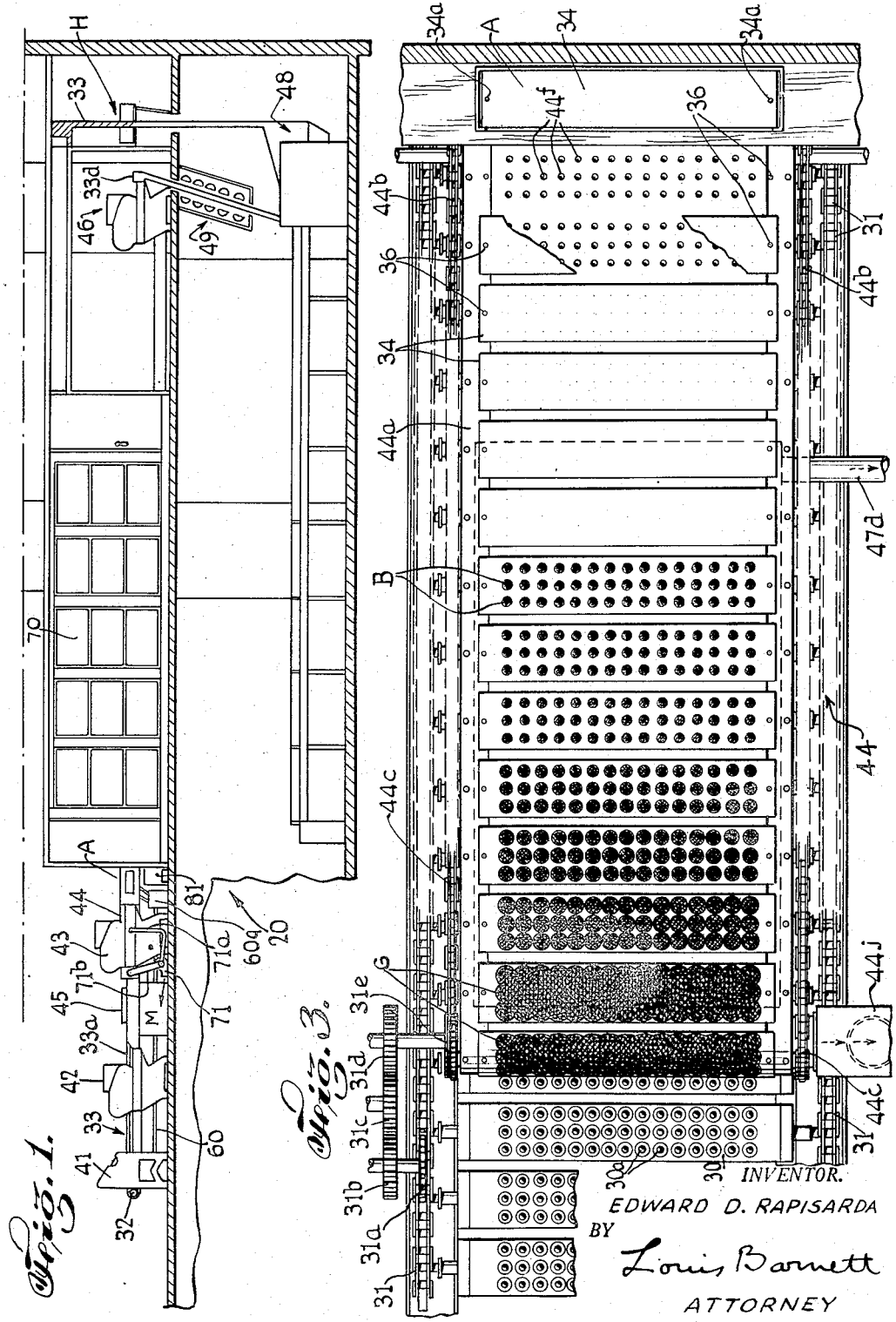
INVENTOR.
EDWARD D. RAPISARDA
BY
Louis Barnett
ATTORNEY

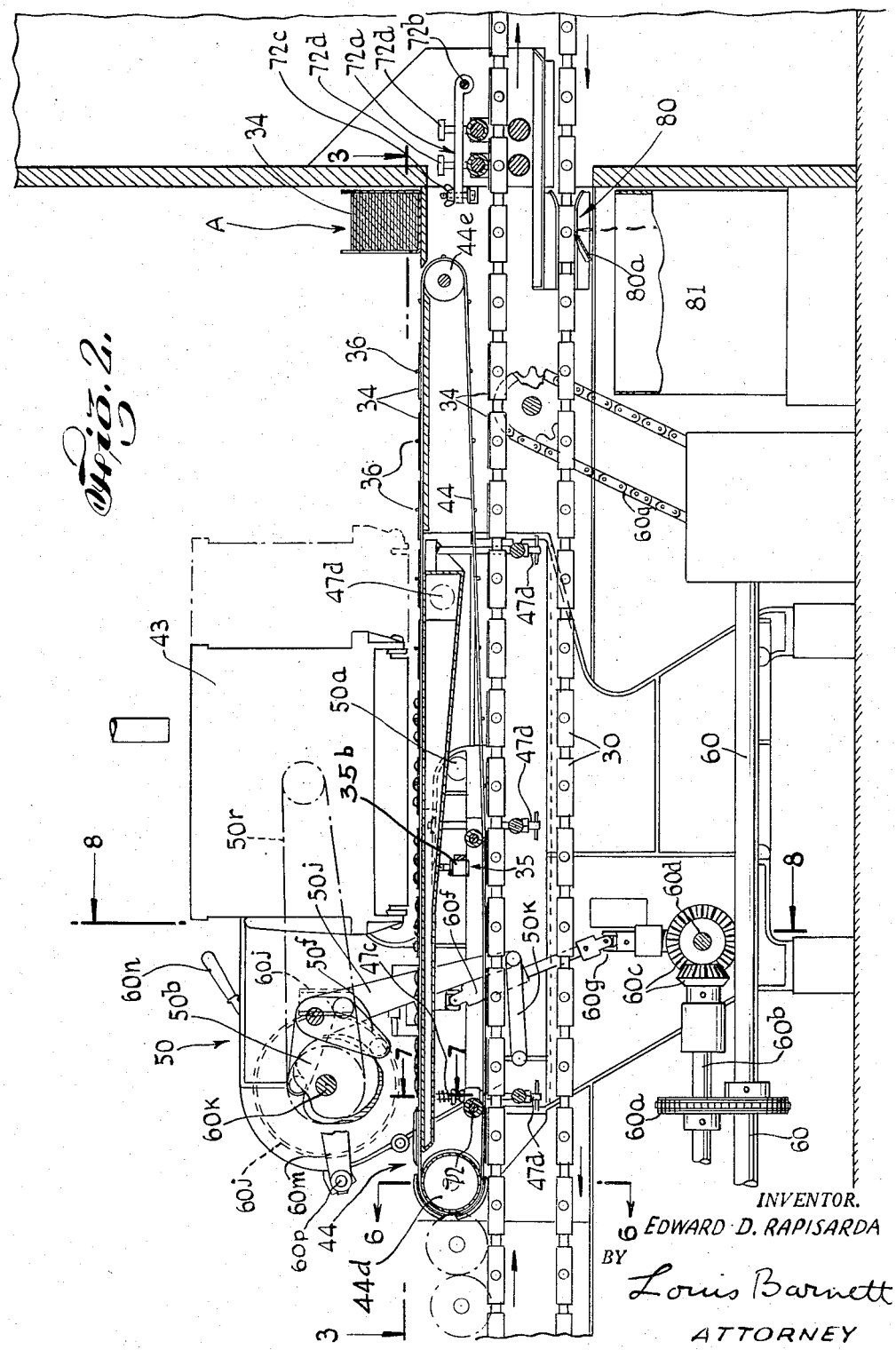

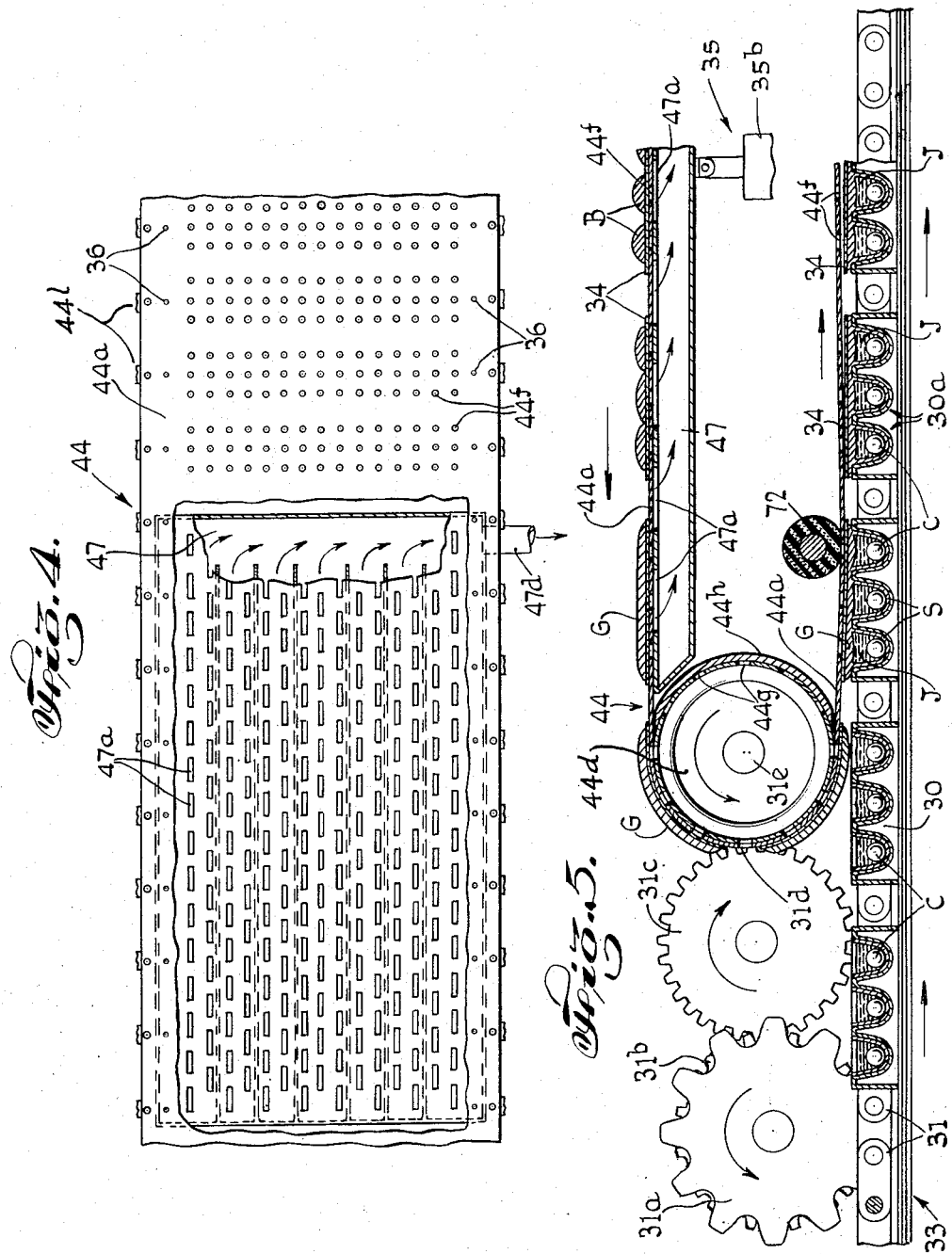

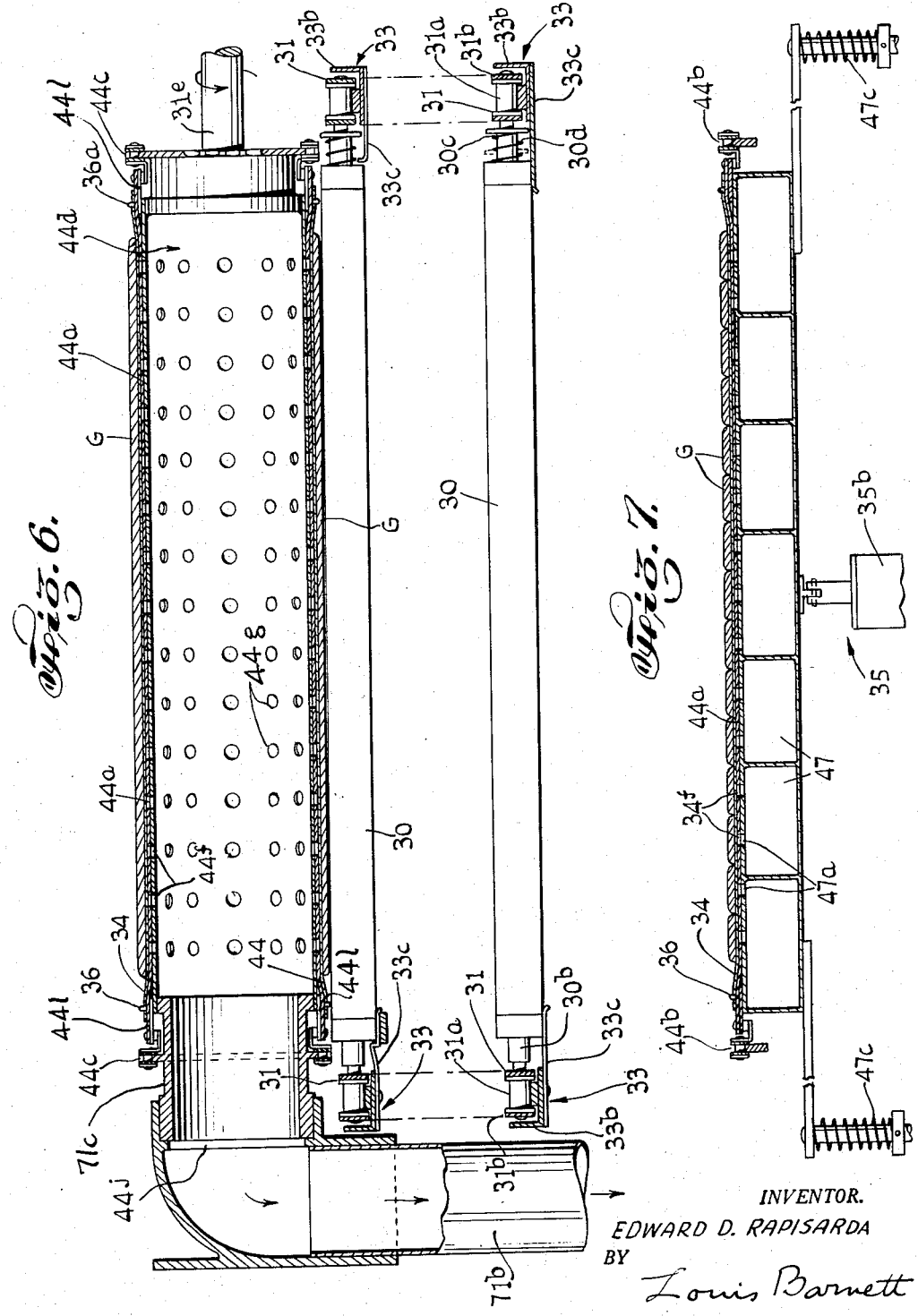

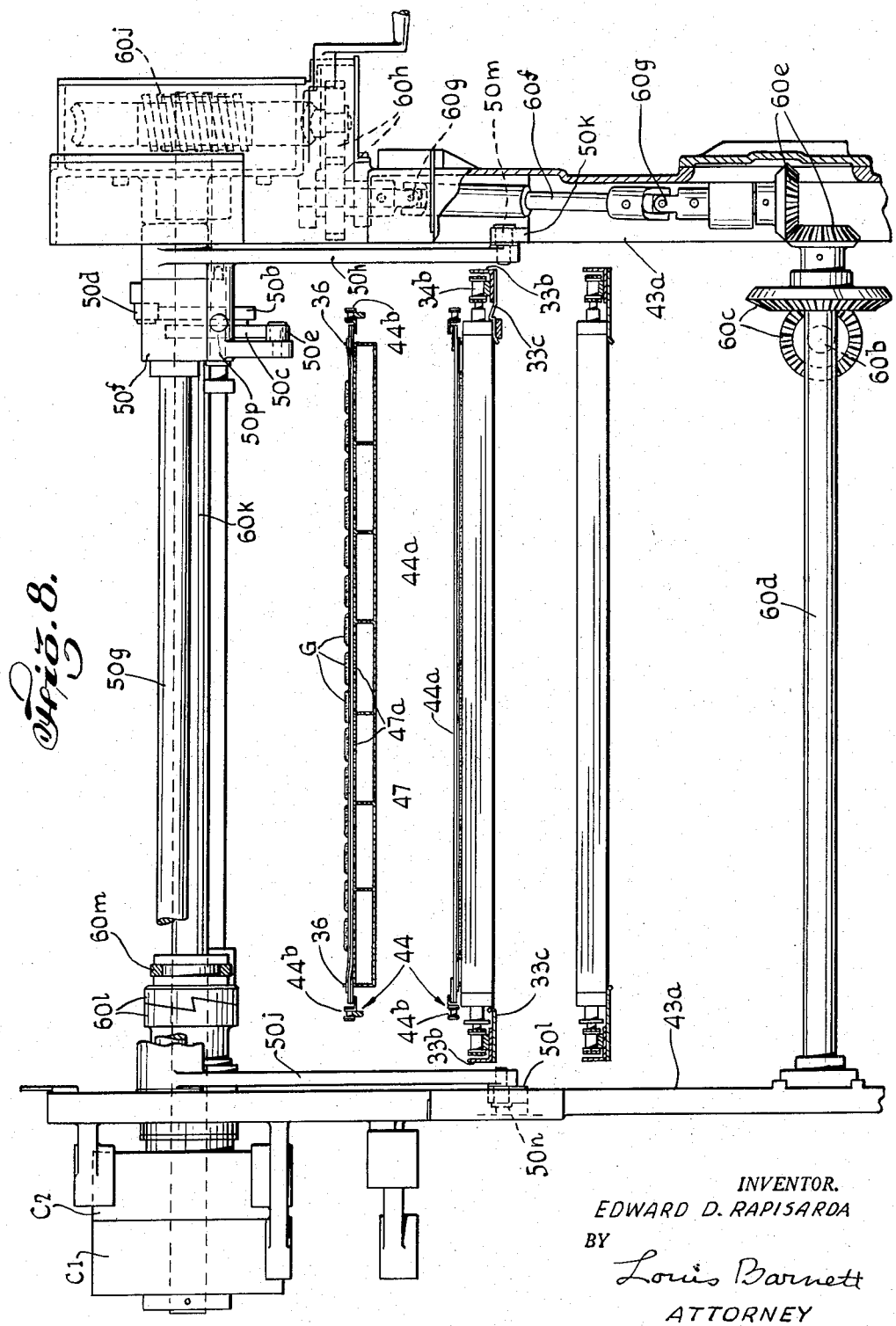

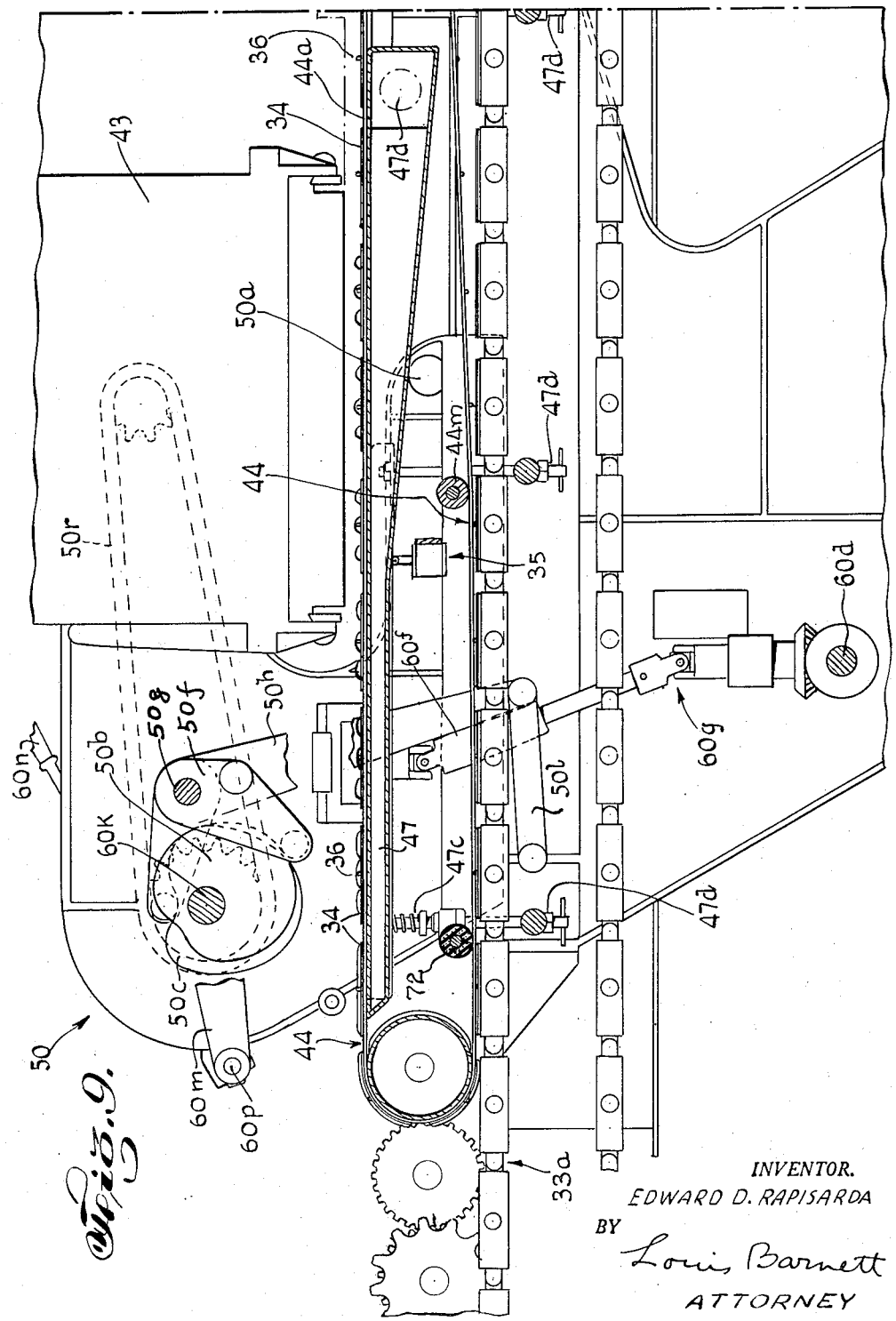

Patented Nov. 3, 1953

2,657,647

UNITED STATES PATENT OFFICE 2,657,647

CONFECTION MACHINERY

Edward D. Rapisarda, Agawam, Mass., assignor to G. Cella, Inc., New York, N. Y., a corporation of New York Application July 2, 1946, Serial No. 681,034

7 Claims. (Cl. 107—1)

1

This invention relates to confection manufacture and more particularly is directed to an improvement in the production of confections filled with liquids, or preserved fruits in juices or syrups and enclosed in sealed chocolate shells.

Among the objects of the invention is generally to improve confection manufacture of the character described requiring apparatus of relatively simple construction, which shall be easy and convenient to operate with minimum skill and labor, which shall be adapted for quantity production at relatively high speed, and which shall be practical and efficient to a high degree in use.

Other objects of the invention will be obvious and in part hereafter pointed out. The invention accordingly consists of features of production of parts which will be exemplified in the manufacture hereinafter described and in which the scope of the application will be indicated by the following claims.

In the accompanying drawing there is shown one of the various possible illustrative embodiments of the invention.

Fig. 1 is a front elevational view of a complete apparatus for high speed quantity production of sealed chocolate shells filled with preserved fruits in syrup, constructed to embody and arranged to practice the invention, Fig. 2 is an enlarged front elevational view, partly in section, showing the chocolate depositor, the power transmission therefor, and a portion of the conveyor equipment shown in Fig. 1 used for applying sealing closures to filled chocolate shells in molds, Fig. 3 is a fragmentary plan view of the conveyors showing the chocolate deposit arrangement relative the molds with the filled cavity as seen from lines 3—3 in Fig. 2, Fig. 4 is a fragmentary plan view, partly broken away, of a portion of the conveyor belt construction under the chocolate depositor and suction system shown in Figs. 2 and 3, Fig. 5 is an enlarged cross sectional view of the leading end portion of the chocolate deposit carrying conveyor, suction system connected therewith, and drive means for advancing of the molds with the filled shells during the sealing closure operation, Figs. 6 and 7 are enlarged cross sectional views of the chocolate deposits carrying conveyor and head pulley taken on lines 6—6, and of the suction system and conveyor belt taken on lines 7—7 in Fig. 2, respectively, Fig. 8 is an enlarged cross sectional view showing details of the depositor transmission drive, conveyors, and the suction system as seen from lines 8—8 in Fig. 2, and Fig. 9 is an enlarged front elevational view, partly broken away, showing details of the leading end of the conveyor, suction system portion of the chocolate distributor and drive transmissions, as seen in Fig. 2.

Referring in detail to Fig. 1 of the drawing, the invention is shown diagrammatically installed in a complete confection manufacturing apparatus 20 constructed for high-speed quantity production, and as herein described is directed to the features of the improved mechanism for applying closure bottom chocolate layers G on filled chocolate shells S which are carried in multicavities 30a of molds 30, the latter preferably being made of metal in the form shown in Figs. 5 and 6.

As seen in Figs. 1, 3 and 6, there is provided a continuous series of said multi-cavity molds 30 uniformly separated and strung between a pair of spaced apart sprocket chains 31 which pass around head sprocket pulleys 32 of a long conveyor 33. The latter has a horizontally disposed front end portion 33a provided with suitable angle side bars or guide rails 33b extending as a support under each of said chains 31. For retaining said molds 30 level during the horizontal movement thereof between said rails 33b, slideway members 33c are projected from said rails 33b as shown in Figs. 6 and 8.

The molds 30 are of the multi-cavity type and may be either cast, machined or stamped and constructed like those disclosed in the patent to Bianchi, No. 2,163,580 of June 27, 1939, except that since said molds 30 are not intended to be manually handled they may each be made larger, that is, with forty-five cavities or cells 30a in three rows instead of thirty. Each mold 30 also may be provided at opposite ends thereof with suitable releasable chain link coupling means as for example, stub shafts 30b and 30c engaging into aligning swivelling portions 31a of conveyor chain links 31b to trunnion each mold 30 therebetween. Stub shaft 30b may be rigidly mounted from the end of said mold 30 but stub shaft 30c is constructed to be retracted against the action of suitable spring 30d so as to facilitate uncoupling for removal or replacement of the molds 30 as is clear from the dotted line position of stub shaft 30c showing in Fig. 6.

As seen in Fig. 1, inwardly from the forward end portion 33a of conveyor 33, there may be mounted to extend thereacross and cooperatively driven with a fruit feeder 41 for supplying cherries C or like preserves, syrup or juice supplier 42, and a movable chocolate bud depositor 43, an oven heater 45 being provided between the juice supplier 42 and said depositor 43. The chocolate bud depositor 43 is raised above conveyor 33 sufficiently to permit passage of a horizontally disposed short conveyor 44 extending only just beyond said depositor 43, as shown in Figs. 2 and 9.

Fruit feeder 41 may be of any conventional make capable when operating of dropping cherries C therefrom into the chocolate shells S in mold cavities 30a on bringing of the latter under and in registered alignment with said feeder 41, in the well understood manner, and as shown in Fig. 1.

Syrup or juice supplier 42 may be of any well understood manufacture and as here shown supplies measured quantities of the syrup or juice J into the chocolate shells S when the molds 30 are brought into registered alignment under the supplier 42 after passing the fruit feeder 41 as seen from Fig. 1.

Movable chocolate bud depositor 43 may be, for example, the depositor construction like disclosed in applicant's Letters Patent No. 2,031,386, issued February 18, 1936, or of any other well known construction to the extent, as here shown, that drops or buds B of chocolate are deposited on uniformly separated flexible sheets 34 carried by belt 44a of short conveyor 44, said deposited buds B being spaced to correspond to the arrangement of the shells S in mold cavities 30a, as shown in Figs. 3 and 5.

In practicing the invention the drops or buds B contain sufficient chocolate in quantity to provide the formation of the bottom closure layers G of the finished confection, said formation being accomplished by a "forced spreading" through a suitable shaker or vibrating means denoted generally at 35 and as shown in Figs. 5 and 7 may be actuated by an electric solenoid 35b mounted between a relatively stationary portion of the machine frame and a resilient mounting of a suction box 47 provided under belt 44a of the short conveyor 44, the operation of which will hereinafter be more fully described.

The oven heater 45 may be of any standard type, as for example, requiring gas fuel or electric power, through which extends a portion of the conveyor 33 so that the shell S in molds 30 after being filled but just before the chocolate bottom closures are supplied, that is, before entering under short conveyor 44 have the top side of the molds 30 and the adjoining shell rim subjected to heat in oven heater 45.

Suitable means for automatically charging the mold cavities 30a with the chocolate shells S so as to make a complete continuous confection manufacture, are provided which include a stationary shell chocolate depositor 46 located inwardly of a rear end portion 33d of said long conveyor 33. Said rear conveyor portion 33d also travels successively through a sheet removal and inspection station H, a mold scraping and finished confection unloader 48, and an empty mold preheater 49 before passing under the stationary shell chocolate depositor 46 as shown in Fig. 1. Mid-portions of said long conveyor 33 pass through a cooling compartment 70 adjacent said chocolate shell depositor 46 and inspection station H as shown in Fig. 1, said cooling compartment 70 being of any well understood construction.

The apparatus 20, when installed, operates as a unitary manufacturing means to produce confections filled with preserved fruits C in syrup J inclosed in sealed chocolate shells S as follows:

Apparatus 20 as described above and shown in drawing, has the empty cavity molds 30, facing up and when in registered alignment under stationary shell chocolate depositor 46, after being preheated preferably by suitable arranged radiant heat in mold preheater 49, each mold 30 receives a charge of molten chocolate sufficient to coat the mold cavities 30a and form shells S. The molds 30 in passing said depositor 46 are then caused to be inverted, to drain, that is, facing down by looping the conveyor chain 31, and are advanced on the lower length of conveyor 33 until said molds 30 are tilted back to in an up facing position on the upper length of said conveyor 33 after being turned at the front conveyor end 33a. The molds 30 with the shells S formed in cavities 30a then pass between the angle guide rails 33b with the conveyor chains 31 moving in the direction indicated by the arrow in Fig. 5 which slideably carries each shell coated mold 30 successively under the fruit feeder 41. The rails 33b, slideway 33c and conveyor sprocket chains 31 positively control the path of movement of said spaced molds 30. As the shell coated molds 30 progressively align in position to register under the fruit feeder 41 a cherry C is dropped into each shell S of the mold cavities 30a.

As the conveyor 33 continues to advance, the fruit filled molds 30 reach an aligning position in register under the syrup supplier 42, and a measured quantity of syrup J is allowed to pass into the shells S with the cherries C. The quantity of syrup J supplied to each shell S may be approximately three quarters the contents thereof so that after sealing said shells S the finished product will be just short of being completely filled.

The molds 30 with the filled shells S then pass through the oven heater 45. Each mold 30 and contents is heated to precondition the upper portions of the shells S prior to sealing the closure bottoms G thereon, the heat absorbed by said molds 30 and contents being sufficient to retain such conditioning until the application of said closure bottom sealing operation is completed in the manner hereinafter described.

As shown in Figs. 1 and 2, flexible sheets 34 are fed onto the short conveyor belt 44a from station A, by suitable means either manually by an operator assigned to inspect the sealing operation or automatically by mechanical sheet feeding means of any well understood construction. Said sheets 34 may be shaped like the top surface of the cavity side of mold 30 but are made slightly longer and wider, said sheets 34 preferably being made of a material or surfaced to have the chocolate buds B deposited and then spread out thereon to a desirable thickness for forming bottom closures G in a readily removable condition without adhering to provide a smoothly finished surface. Said sheets 34 may be made with suitable means, such as spaced end border openings 34a to fit a correspondingly spaced set of pins 36 upstanding from said belt 44a for detachably retaining said sheets 34 in uniform spaced relation thereon as shown in Figs. 2, 3, 6, 7, 8 and 9.

The short conveyor 44, like conveyor 33 is of the endless type and has the belt 44a thereof stretched between spaced sprocket chains 44b, angle hanger piece and fittings 44l being provided for carrying said pins 36 and attaching said belt 44a to the sprocket chain 44b as shown in Figs. 6 and 8. Said chains 44b pass over drive sprockets 44c mounted to turn with a hollow head pulley 44d and a suitable tail pulley 44e on which said belt 44a rides. The conveyor 44 extends immediately over the long conveyor front end 33a with the top length thereof passing under chocolate bud distributor 43 as shown in Figs. 2 and 9.

The belt 44a beside having pins 36 upstanding therefrom is perforated with spaced openings 44f which preferably are arranged in a formation to be uniformly distributed on the under side of the sheets 34 as shown in Figs. 4, 5, 6 and 7. Positioned under the top length of said belt 44a for a distance between said chocolate depositor 43 and said hollow head pulley 44d there is said supporting flue or air exhaust box 47 which together with said head pulley 44d provide suction means to retain the sheets 34 firmly to the belt 44a for preventing the sheets 34 from being displaced during vibration and passage thereof around the head pulley 44d, when said sheets 34 progress from an upturned closure layer G forming position to a downturned sealing position facing the cavity side of the moving filled molds 30 on conveyor 33. Said exhaust box 47 is slitted as at 47a, on the upper side thereof over which said belt 44a slides and communicates with the rear sides of sheets 34 through belt openings 44f as is clear from Figs. 2, 3, 4, 5, 6, 7 and 9.

As shown in Figs. 5, 6 and 9, the suction in head pulley 44d is exerted through spaced surface openings 44g provided therein which are arranged and constructed to align with conveyor belt openings 44f whereby the rear side of each sheet 34 is firmly retained to said belt 44a as it passes around the conveyor head pulley 44d. To prevent leakage through the pulley openings 44g when the belt 44a is not in contact therewith an arcuate shaped stationary shield 44h is fitted to the rear facing side of said head pulley 44d to serve as a closure and make ineffective the underlying pulley openings 44g as shown in Figs. 5 and 9.

As shown in Figs. 2 and 7, the air or suction box 47 over which the upper portion of conveyor belt 44a rides is mounted from the machine frame on suitable spaced apart spring suspensions 47c, the electric solenoid 35b of said vibrating means 35 being mounted on the under side of said suction box 47. There is also provided a plurality of adjusting screw supports 47d for said suspensions 47c as shown in Figs. 2 and 9 for the suction box 47 whereby the level and height of the latter with respect to the conveyor belt 44a may be regulated as required for smooth operation.

"Forced spreading" of the drops or buds B of chocolate laid down on flexible sheets 34 by depositor 43 to form bottom layers G may be accomplished by providing said vibration means 35 and takes place while the buds B are in a plastic state. Thus, as seen from Fig. 5, energizing said solenoid 35b from a suitable electric power source (not shown) will cause the suction box 47 and the portion of conveyor belt 44a passing thereover to vibrate the sheets 34 with buds B advancing from the depositor 43. This vibration is exerted for a length of time sufficient to provide the "forced spreading" of the buds B from the conical shape and size shown in Figs. 3 and 5, on the right upper conveyor portion to the wafer-thin form closure bottom layer G, shown on the left of said upper conveyor. In Fig. 5 it is also shown that the molds 30 with the unsealed filled shells S as they continue to advance, each pass beneath the short conveyor 44 and said bottom layers G are turned to face the top side of said molds 30 and is seated in exact aligned register with said filled shells S in mold cavities 30a. As the molds 30 continue to advance and pass beyond the conveyor head pulley 44d, suitable means, such as a sponge rubber roller 72, mounted to press the rear surface of the lower portion of belt 44a, is provided to give bottom layers G through the flexible sheet 34 a rolling, that is, a progressively squeezing pressure for completely sealing said layer G in position on said filled shells S in the mold cavities 30a.

As seen in Figs. 2 and 9, the sealed filled shells S in the molds 30 with the flexible sheets 34 after passing under roller 72, as at idler pulley 44m and beyond conveyor tail pulley 44e have the sheets 34 completely freed from the under portion of the conveyor belt 44, and pass between double roller sets of squeegee spaced apart appliances 72a which are hinged at 72b as a unit and releasably secured in effective position by wing screw 72c. Each of said squeegee roller sets is individually adjustable by a headed screw 72d so that each mold 30 with the sealed filling may be compressed successively with the flexible sheet 34 interposed by having progressively applied pressure to positively assure that the closure layer material G is sufficiently solidified in perfect sealing position.

One feature of the invention is the improved means as described above of forming the bottom layers G and sealing the filled shells S in the molds 30 which includes a mechanism, denoted generally at 50, for reciprocating the bud depositor 43 on suitable traction means, such as wheels 50a riding on the upturned side edges of said guide rails 33b which serve as tracks as shown in Figs. 2 and 9. By oscillating the depositor 43 over the upper portion of the conveyor 44, the latter and conveyor 33 may be operated continuous at a uniform speed without dwells or stops while the depositor 43 is moved to and fro in timed relation and in forward unison with the movement of each group of the sheets 34 during the depositing period of the buds B thereon as is clear from Figs. 2 and 9.

For driving the complete apparatus 20, suitable power transmission is provided, as for example as shown in Figs. 1, 2, 8 and 9, a main drive shaft 60 is provided from a power source such as motor M or variable speed unit in the well understood manner. The drive shaft 60 through a suitable gear take-off as for example, as indicated in Fig. 1 at 60q, and suitable sprockets to mesh with the spaced conveyor chains 31, in the well understood manner may be used to continuously drive said long mold conveyor 33. Said drive shaft 60 through a sprocket-chain drive 60a also turns a countershaft 60b which by means of a bevel gear set 60c drives a horizontally disposed lower cross shaft 60d journalled between frame structural members 43a of said depositor 43. Lower cross shaft 60d through another set of bevel gears 60e as shown in Fig. 8 drives an upturned flexible transmission shaft 60f including universal joints 60g. Said shaft 60f turns through a gear set 60h and a worm-wheel drive 60j, a horizontally disposed upper cross shaft 60k also journalled between said structural members 43a on which there is mounted for rotating therewith a suitable uniform motion double heart cams 50b and 50c of the depositor reciprocating mechanism 50. Said shaft 60k as shown in Fig. 8, may be provided with a suitable intermediate shaft clutch 60l controlled through a yoke 60m terminated by hand lever 60n for selectively throwing chocolate supply pumps in and out of operation, only pump actuating cams C1 and C2 thereof mounted on shaft 60k being shown in Fig. 8. Said clutch yoke 60m may be mounted on rod 60p secured to be operated by said hand lever 60n as shown in Figs. 2 and 9.

The depositor moving cams 50b and 50c cooperate with rollers 50d and 50e, respectively, carried by a lever member 50f, which is mounted to swing with a rock shaft 50g. The opposite ends of said rock shaft 50g are supported by links 50h and 50j through arms 50k and 50l, respectively, pivoted to the frame structure members 43a as at 50m and 50n, respectively, as shown in Fig. 8, said lever member 50f being pinned at 50p to move with link 50h.

For actuating the chocolate bud depositor valve mechanism (not shown) whereby the timing of the delivery of buds B to the sheets 34 is determined a suitable chain drive 50r or the like, is provided and driven from the cam shaft 60k as shown and indicated in dotted lines in Figs. 2 and 9.

The shells S in mold cavities 30a before being filled and sealed with the closure layer material G, may be prepared therefor by scraping during the passage of the molds 30 along the lower portion of conveyor 31, as for example, as shown in Fig. 2 where scraper member 80 having a suitable bent knife 80a is provided, said knife being pressed against the downwardly turned cavity side of mold 30 to shave smooth the edge rims of the coated shells S therein. For receiving the scrapings from said knife 80a a container 81 may be positioned thereunder.

To provide suction for the exhaust box 47 and conveyor head pulley 44d, a suitable blower or fan 71 may be provided and driven from the main transmission drive 60. Said blower 71 being connected to outlets 47d and 44j of said box 47 and pulley head 44d, respectively, by pipes 71a and 71b respectively, as shown in Figs. 1, 3 and 6.

As seen from Figs. 3, 5 and 9 the upper portions of long conveyor 33 and short conveyor 44 run in relatively opposite directions, the power drive from said conveyor 33 being taken off in any convenient manner, from the main drive shaft 60. For driving conveyor 44 there may be provided a sprocket 31a driven from conveyor sprocket chains 31 which is suitably mounted to turn with a gear 31b. The latter meshes with an idler gear 31c, which in turn meshes with a gear 31d mounted to turn stub shaft 31e which also carries sprocket 44c and one end of the conveyor head pulley 44d. The other end of conveyor head pulley 44d, may have a rotary sleeve bearing connection 71c wherethrough the exhaust outlet 44j passes into the blower connection pipe 71b as shown in Fig. 6.

It is thus seen that belt conveyor 44 operates to receive and carry the flexible sheets 34 under the bud depositor 43 and to turn said sheets 34 with the "forced spread" bottom layer G spaced to correspond to the filled mold cavities 30a, said sheets 34 and bottom layer G being retained by said pins 36 and the suction system acting through the conveyor belt 44a and head pulley 44d for registering the alignment in sealing the filled shells S as above described. It should be noted that idler pulley 44m serving to control the separation of the sheets 34 from belt conveyor 44 is constructed, arranged and positioned to assure positive dislodgement of the sheets 34 from the pins 36.

It will thus be seen that there is provided an improved confection manufacture in which the several objects of the invention are achieved and which are well adapted to meet the conditions of practical use.

As various other possible embodiments of the invention might be made of the above invention, and as various changes in the embodiment above set forth, it is to be understood that all matters herein set forth or shown in the accompanying drawings and described in the specification are to be interpreted as illustrative and not in a limiting sense.

Having thus described my invention, I claim as new, and desire to secure by Letters Patent:

1. In a confection making apparatus, a continuously moving first horizontally disposed conveyor, molds having cavities with unsealed filled shells carried by said first conveyor, a continuously moving second endless conveyor having a perforated belt horizontally disposed to pass over said molds carried on the first conveyor, uniformly spaced flexible sheets positioned for movement with an upper portion and around to an under portion of said second conveyor belt on an outer side thereof in a registered alignment relation to said mold cavity filled shells, a suction system constructed and arranged along an under side of said perforated conveyor belt upper portion to releasably retain the sheets on said belt outer side, a depositor mounted for movement over the path of travel of said sheets and arranged to intermittently supply shell closure layer material thereon corresponding to the arrangement of the unsealed side of said filled shells in the mold cavities carried by the first conveyor, means for reciprocating said depositor in timed relation with respect to the movement of the sheets with said belt conveyor, and means for depositing said layer closure material during the movement of the depositor in the same direction as said moving sheets on the upper portion of the second conveyor belt, and means for exerting pressure on the rear side of said conveyor belt under portion beyond said suction system and through said flexible sheets for sealing said filled shells in the cavity molds with said closure layer material.

2. In a confection making apparatus, a continuously moving horizontally disposed first endless conveyor, molds having cavities formed with shells each having an unsealed side wherethrough a contents is supplied mounted for movement on said first conveyor, a station located in the path of movement of said mold cavities for filling said shells with said contents while said shells advance on said first conveyor at a continuous constant speed, a continuously moving second endless conveyor positioned vertically over said first conveyor, said second conveyor having an upper run moving in a direction opposite to said first conveyor and a lower run moving in the same direction and at the same speed as said first conveyor, said lower run being disposed to pass over said molds carried by the first conveyor after filling of the shells at said station, uniformly spaced flexible sheets positioned for movement with said upper run and around to said lower run in a registered alignment relation to said mold cavity filled shells, a reciprocating depositor mounted for movement over the path of travel of said sheets on said upper run including a portion thereof for intermittently dispensing shell closure material on said sheets corresponding to the arrangement of the unsealed side of said filled shells in the mold cavities carried by the first conveyor, and means driven from a single power source for moving said first and second conveyors in timed relation, for reciprocating said depositor in timed relation to the movement of the sheets on said second conveyor, and for depositing said layer closure material on said sheets during the movement of the depositor in the same direction as said second conveyor upper run.

3. In a confection making apparatus, a horizontally disposed first endless conveyor, molds having cavities formed with shells each having an unsealed side wherethrough a contents is supplied mounted for movement with said first conveyor, a plurality of spaced stations located in the path of movement of said mold cavities for filling said shells with said contents while said shells advance on said conveyor at a continuous constant speed, a second endless conveyor positioned vertically over said first conveyor, said second conveyor having an upper run moving in a direction opposite to said first conveyor and a lower run moving in the same direction as said first conveyor, said lower run being disposed to pass over said molds carried by the first conveyor after filling of the shells at said spaced stations, uniformly spaced flexible sheets positioned for movement with said upper run and around to said lower run in a registered alignment relation to said mold cavity filled shells, a reciprocating depositor mounted for movement over the path of travel of said sheets on said upper run including a portion thereof for intermittently dispensing shell closure material on said sheets corresponding to the arrangement of the unsealed side of said filled shells in the mold cavities carried by the first conveyor, and drive means for continuously moving said first and second conveyors without interruption in timed relation including means for depositing said layer closure material on said sheets during the movement of the depositor in the same direction as said second conveyor upper run.

4. In the confection making apparatus defined in claim 2, said second conveyor having spaced through-openings, and a suction system positioned under said upper run of the second conveyor effective to communicate through said openings with said sheets for releasably retaining the sheets for said movement with the conveyor.

5. In a confection making apparatus, a continuously moving horizontally disposed first endless conveyor, molds having cavities formed with shells each having an unsealed side wherethrough a contents is supplied mounted for movement on said first conveyor, a station located in the path of movement of said mold cavities for filling said shells with said contents while said shells advance on said first conveyor at a continuous constant speed, a second conveyor for continuously moving flexible sheets carrying closure material for sealing said shells in a direction relatively opposite to the movement of the molds with said filled shells on said first conveyor and part way in the same direction in registered alignment therewith, means for depositing said closure material on said sheets in an arrangement corresponding to said filled shells in the mold cavities, means for moving the depositing means to and fro in relation to the path of movement of said sheets and for making said depositing means effective intermittently while said sheets move in said opposite direction, said second conveyor including a suction system for removably retaining said sheets in position when moving in said opposite direction.

6. In the confection making apparatus defined in claim 5, said suction system including a perforated hollow head pulley and perforated conveyor belt with the openings arranged to be covered on positioning said flexible sheets thereover, an air box extending under said perforated conveyor belt spaced from the head pulley, said box having slots over which the conveyor belt openings pass, and exhaust blower connected to reduce the air pressure within the hollow head pulley and air box for retaining the flexible sheets in position by suction while moving with said conveyor belt around said head pulley.

7. In a confection machine, means for depositing shell closure material to be moved in registered alignment with unsealed filled shells in mold cavities on a conveyor moving along a path in one direction; moving means intermediate the depositing means and said path of the mold cavities for receiving the shell closure material when moving along a path in a direction opposite to said direction of said conveyor, means for reversing the direction of travel of the shell closure material moving means, and means for applying said closure material to said filled shells in said moving mold cavities; means for oscillating said depositing means to and fro with respect to the path of movement of said intermediate moving means; a power drive for operating said moving means and said conveyor in timed relation; a flexible transmission drive interconnecting said power drive with said oscillating means; and means connecting said power drive with said oscillating means for controlling the depositing of said closure material to be effective only when said depositing means is moving in the direction opposite to the direction of the path of movement of said conveyor.

EDWARD D. RAPISARDA.

References Cited in the file of this patent

UNITED STATES PATENTS

| Number | Name | Date |
| --- | --- | --- |
| 1,077,400 | Droitcour | Nov. 4, 1913 |
| 1,625,642 | Droitcour | Apr. 19, 1927 |
| 1,701,317 | Stokes | Feb. 5, 1929 |
| 1,724,077 | Fleischer et al. | Aug. 13, 1929 |
| 1,790,361 | Winkler et al. | Jan. 27, 1931 |
| 2,031,386 | Rapisarda | Feb. 18, 1936 |
| 2,163,580 | Bianchi | June 27, 1939 |
| 2,487,417 | Bianchi | Nov. 8, 1949 |